US010633012B2

(12) United States Patent
Phillips et al.

(10) Patent No.: US 10,633,012 B2
(45) Date of Patent: Apr. 28, 2020

(54) SELF-CHECKOUT IN RETAIL STORES

(71) Applicant: MasterCard International Incorporated, Purchase, NY (US)

(72) Inventors: Simon Phillips, York (GB); Alan Johnson, Essex (GB)

(73) Assignee: Mastercard International Incorporated, Purchase, NY (US)

(*) Notice: Subject to any disclaimer, the term of this patent is extended or adjusted under 35 U.S.C. 154(b) by 938 days.

(21) Appl. No.: 14/956,773

(22) Filed: Dec. 2, 2015

(65) Prior Publication Data

US 2017/0158215 A1 Jun. 8, 2017

(51) Int. Cl.
| | |
|---|---|
| *B62B 5/00* | (2006.01) |
| *B60B 19/00* | (2006.01) |
| *G06Q 20/20* | (2012.01) |
| *G06Q 30/06* | (2012.01) |
| *G07G 1/00* | (2006.01) |
| *B60B 33/00* | (2006.01) |
| *B62B 3/14* | (2006.01) |

(52) U.S. Cl.
CPC .......... *B62B 5/0096* (2013.01); *B60B 19/00* (2013.01); *G06Q 20/208* (2013.01); *G06Q 30/0633* (2013.01); *G07G 1/0036* (2013.01); *G07G 1/0081* (2013.01); *B60B 33/0015* (2013.01); *B60B 2200/432* (2013.01); *B62B 3/14* (2013.01); *B62B 2203/50* (2013.01)

(58) Field of Classification Search
CPC ....... B62D 39/00; G06Q 20/18; G06Q 20/343
USPC ................. 280/33.992; 705/17, 23
See application file for complete search history.

(56) References Cited

U.S. PATENT DOCUMENTS

| | | | | |
|---|---|---|---|---|
| 5,064,012 | A * | 11/1991 | Losego | B62B 5/0026 180/19.1 |
| 6,928,343 | B2 * | 8/2005 | Cato | G06Q 10/0875 340/5.91 |
| 8,120,190 | B2 * | 2/2012 | Bravo | H02J 7/02 290/1 R |
| 8,464,945 | B2 * | 6/2013 | Connelly | B62B 3/148 235/375 |
| 2004/0238629 | A1 * | 12/2004 | Buchholz | G06K 7/10861 235/383 |

(Continued)

FOREIGN PATENT DOCUMENTS

| | | |
|---|---|---|
| WO | 2000073971 A1 | 12/2000 |
| WO | 2002001476 A2 | 1/2002 |

*Primary Examiner* — Olusegun Goyea
(74) *Attorney, Agent, or Firm* — Buckley, Maschoff & Talwalkar LLC

(57) ABSTRACT

A wheel assembly for installation on a shopping cart to retro-fit the shopping cart for facilitating self-checkout. The wheel assembly may include a support structure and a wheel rotatably supported on the support structure. The wheel assembly may further include a rechargeable battery supported by the support structure and a charging module supported on the support structure. In addition, the wheel assembly may include a force-detection module configured to provide a signal related to an item event in which an item is deposited within the shopping cart. Still further, the wheel assembly may include a processing and communications unit configured to receive the signal from the force-detection module. The processing and communications unit may transmit the signal to a device that is separate from the wheel assembly.

7 Claims, 7 Drawing Sheets

(56) References Cited

U.S. PATENT DOCUMENTS

| | | | | |
|---|---|---|---|---|
| 2004/0249717 | A1* | 12/2004 | Shirasaki | G07G 1/0072 |
| | | | | 705/17 |
| 2005/0230472 | A1* | 10/2005 | Chang | G06Q 20/343 |
| | | | | 235/383 |
| 2010/0078903 | A1* | 4/2010 | Bravo | B62B 5/0056 |
| | | | | 280/33.992 |
| 2013/0080719 | A1* | 3/2013 | Connelly | B62B 3/148 |
| | | | | 711/154 |
| 2014/0214577 | A1* | 7/2014 | Acker, Jr. | G07G 1/0081 |
| | | | | 705/23 |

* cited by examiner

SELF-CHECKOUT IN RETAIL STORES

BACKGROUND

Self-checkout systems have been introduced in retail stores to reduce labor costs and support greater convenience for shoppers. However such systems are not without concerns relating to shoppers' compliance with the systems.

In proposed systems, product scanning and weighing functionalities have been associated with shopping carts to streamline, and to some extent, police, self-checkout by customers.

The present inventors have now recognized opportunities to lower costs and improve functioning of retail store self-checkout systems.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a shopping cart may be retrofitted with "smart wheels" that detect and report the weight of items added to the cart while the cart is being used by a shopper. The shopper's smartphone (or other handheld device—such as a store-supplied scanner) may receive the item weights reported from the cart wheels and may cross-check reported events from the wheels against product scanning operations performed by the shopper on items with the smartphone before the items are deposited in the shopping cart. The smartphone/handheld scanner may accumulate and total the selected, scanned items and initiate a payment transaction via radio communications with a retail store computer to consummate the shopper's self-checkout. In the case of a store-supplied handheld scanner, the latter may include payment-card-reading capabilities.

Figure 1:
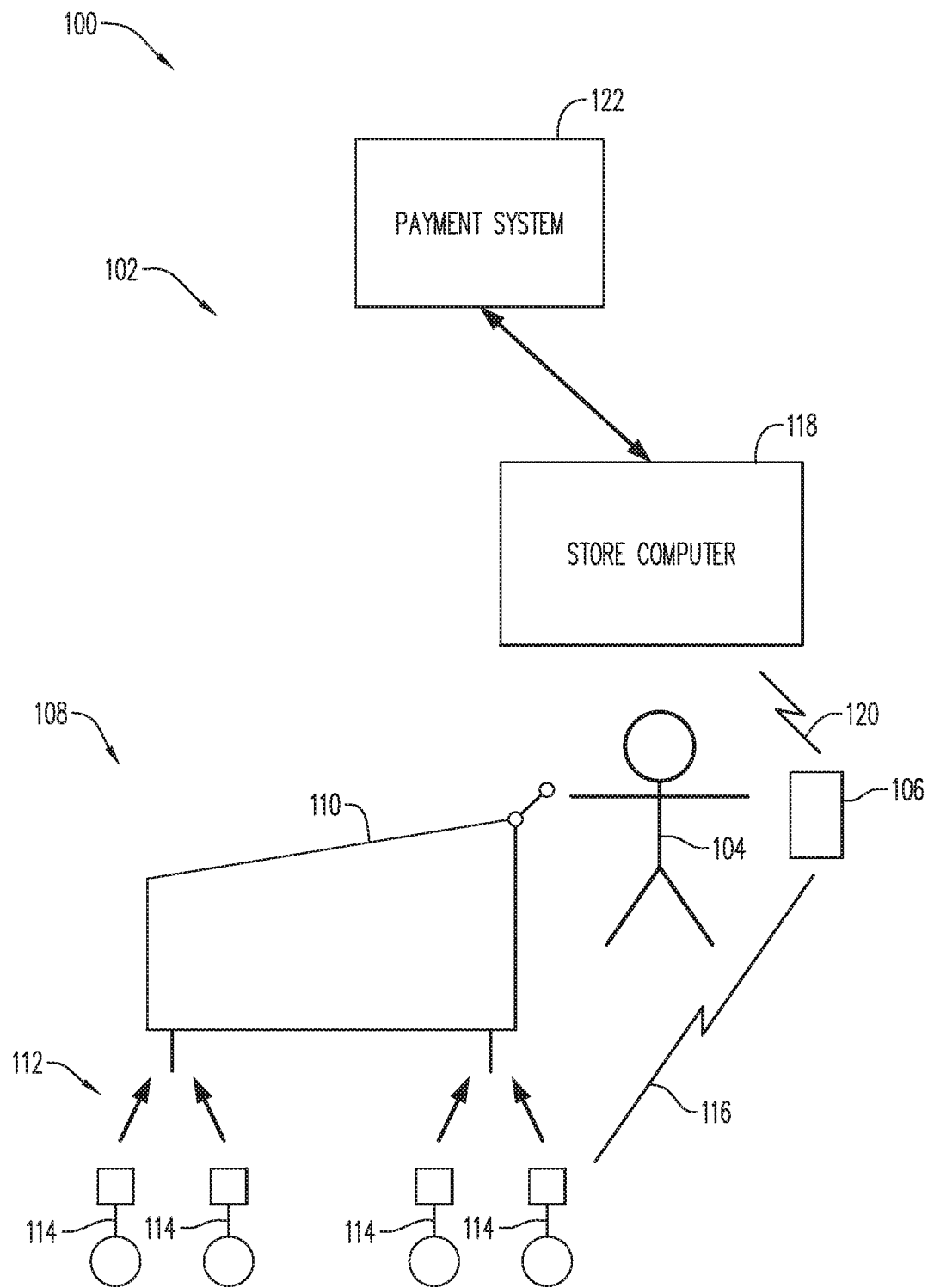
FIG. 1 is a schematic pictorial representation of a self-checkout system according to some embodiments.

FIG. 1 is a schematic pictorial representation of a self-checkout system 100 according to some embodiments. The self-checkout system 100 may be located in a retail store environment, generally indicated by reference numeral 102. It is assumed that a user/customer 104 has visited the store for the purpose of purchasing a number of items. It is further assumed that the user 104 has brought along his/her smartphone 106 (or another mobile device). It is assumed still further that the smartphone 106 has been programmed with one or more "apps" to facilitate operation of the self-checkout system 100. In other words, the smartphone 106 may be considered effectively a component of the self-checkout system 100. Details of the smartphone 106 and functionality provided by the above-mentioned app or apps will be discussed below.

Another functional component of the self-checkout system 100 is a shopping cart 108 which is used by the user 104 while collecting the items he/she wishes to purchase. The shopping cart 108 may have features and functions as described herein and in accordance with some embodiments so as to aid in the operation of the self-checkout system 100. In some embodiments, the shopping cart 108 may include a cart body 110, which has previously been retro-fitted (as indicated schematically at 112) with "smart wheel" assemblies, which are indicated at 114, and which will sometimes be individually referred to as a "wheel assembly 114." In some embodiments, a mass retrofit with "smart wheel" assemblies may have been applied to all of the shopping carts at the store in the process of installing/rolling out the self-checkout system 100. It will be appreciated that this may have occurred at some point in time prior to the visit of the user 104 as illustrated in FIG. 1.

As will be understood, wireless communication (reference numeral 116) may take place between at least one wheel assembly 114 and the smartphone 106.

Another component of the self-checkout system 100 is a store computer 118. As indicated at 120, there may be wireless communication between the store computer 118 and the smartphone 106. As discussed in more detail below, a portion of the functionality provided by the store computer 118 may overlap with conventional product look-up functions typically provided in retail stores in support of product scanning at point of sale terminals/checkout counters.

Also shown in FIG. 1 is a payment system 122. The payment system 122 may resemble a typical payment system (e.g., such as that operated by MasterCard International Incorporated, which is the assignee hereof) that supports, e.g., payment-card-based transactions at the point of sale. As is familiar to those who are skilled in the art, the payment system 122 may include parties such as an acquirer bank (or payment processor standing in for the acquirer), a payment network (e.g., the BankNet system operated by MasterCard International Incorporated), and a number of payment account issuers. As is also familiar to those who are skilled in the art, a payment authorization request message may be routed via the payment system 122 from the store to an issuer of a payment account issued to the user 104, and an authorization response message may be routed back from the account issuer to the store.

Figure 2:
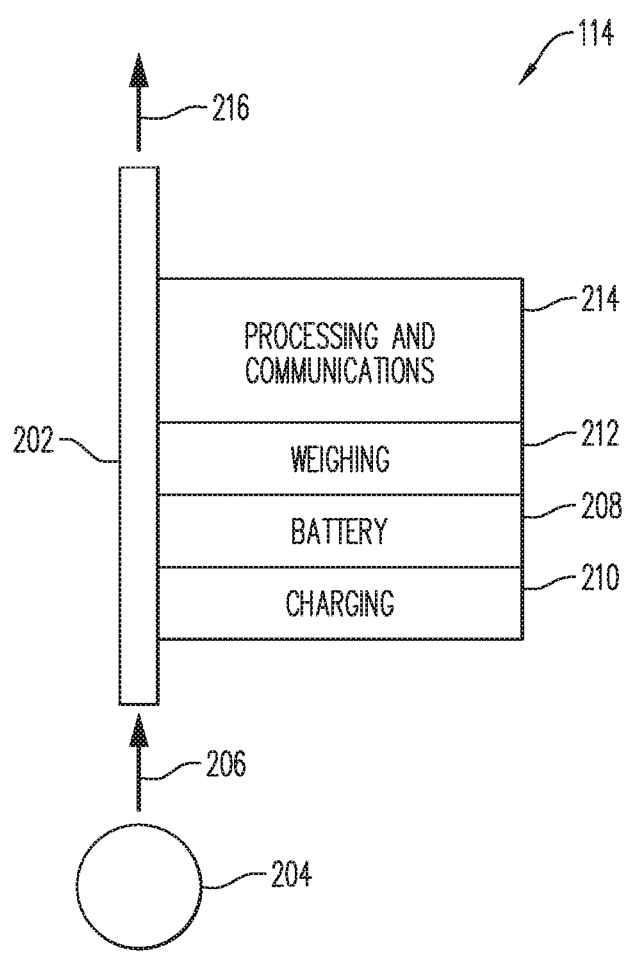
FIG. 2 is a schematic representation of a wheel assembly that may be used to retrofit a shopping card to aid in self-checkout according to some embodiments.

FIG. 2 is a schematic representation of an embodiment of the wheel assembly 114 referred to above.

The wheel assembly 114 may include a support structure 202. The wheel assembly 114 may further include a wheel 204. The wheel 204 may be rotatably supported on the support structure 202. For example, the wheel 204 may be rotatably attached to the bottom of the support structure 202 by a mounting mechanism schematically indicated by arrow mark 206.

The wheel assembly 114 may further include a rechargeable battery 208 supported on the support structure 202. In addition, the wheel assembly 114 may include a charging module 210 supported on the support structure 202. The charging module 210 may be mechanically linked to the wheel 204 and may be configured to convert rotational energy of the wheel 204 into an electrical current. Further, the charging module 210 may be conductively coupled to the battery 208 so as to provide the electrical current generated by the charging module 210 to the battery 208 in a manner suitable for recharging the battery 208.

Still further, the wheel assembly 114 may include a force-detection module 212 supported on the support structure 202. In some embodiments, the force-detection module 212 may be a weighing module configured to provide a weight signal indicative of the weight of the shopping cart 108 and/or of one or more items (not shown) that have been or are currently being deposited in the shopping cart 108 by the user 104. In other embodiments, the force-detection module 212 may simply be configured to detect and signal that an item has been deposited in the shopping cart 108, but without detecting the item's weight. The force-detection module 212 may be conductively coupled to the battery 208 so as to be powered by the battery 208. The force-detection module 212 may, for example, include a strain gauge, which is not separately shown.

Moreover, the wheel assembly 114 may include a processing and communications unit 214 supported on the support structure 202. The processing and communications unit 214 may include processing and communications circuitry, which is not separately shown. The processing and communications unit 214 may be programmed and/or configured to receive the weight signal from the force-detection module 212. For that purpose, the processing and communications unit 214 may be operatively coupled to the force-detection module 212. The processing and communication unit may also be conductively coupled to the battery 208 so as to be powered by the battery 208.

The wheel assembly 114 may also include a mounting mechanism secured to or integral with the support structure 202 (and schematically indicated in FIG. 2 by arrow mark 216) to allow the wheel assembly 114 to be retrofittingly mounted to the cart body 110 of the shopping cart 108.

In some embodiments (and referring again to FIG. 1), each of the respective wheel assemblies 114 may communicate respective weight signals to the smartphone 106. This may occur, for example, in accordance with the well-known Bluetooth communication standard, and the respective processing and communications units 214 of the wheel assemblies 114 may incorporate suitable Bluetooth communications circuitry, which is not separately shown.

In other embodiments, one of the wheel assemblies 114 may be programmed and/or configured to serve as a "master" wheel assembly and the other three wheel assemblies 114 may be programmed and/or configured to act as "subordinate" wheel assemblies. In such embodiments, the subordinate wheel assemblies may communicate respective weight signals to the master wheel assembly. The master wheel assembly, in turn, may perform processing based on its own weight signal and based on the weight signals communicated to it from the subordinate wheel assemblies. The master wheel assembly may then transmit a resulting processed weight signal to the smartphone 106 as indicated at 116 in FIG. 1. The processing and/or transmission and/or receipt of communications by the wheel assemblies 114, as described above, may be performed by their respective processing and communications units 214, which may be programmed and/or configured for such purposes. The communications among and/or from the master/subordinate wheel assemblies may be in accordance with the Bluetooth standard and/or any other suitable mode of short range radio communication. Suitable measures may be taken to manage and/or arbitrate and/or obviate potential collisions among transmissions from the wheel assemblies 114.

Figure 3:
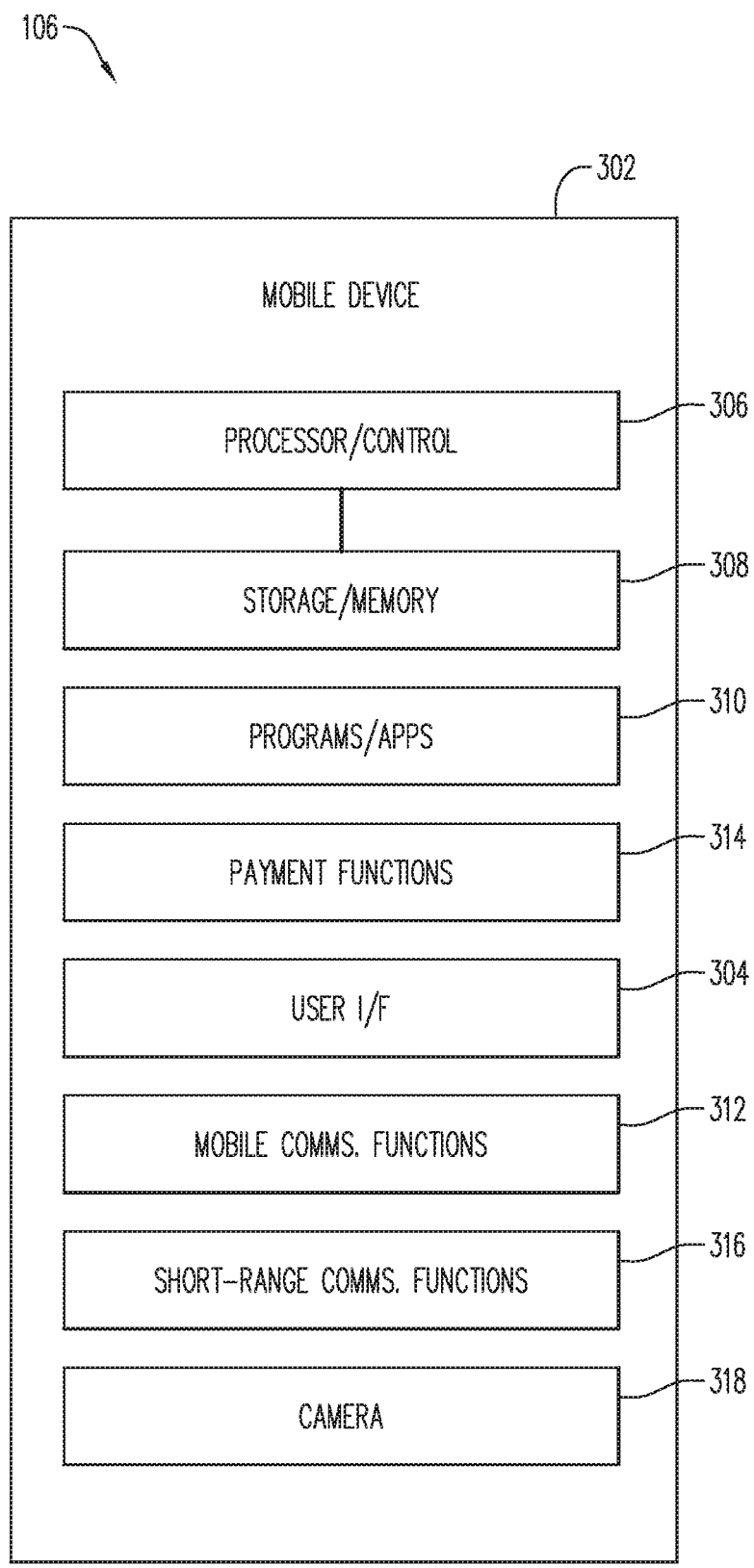
FIG. 3 is a simplified block diagram that represents a mobile communications device that may be programmed to serve as part of the system of FIG. 1.

FIG. 3 is a block diagram of an example embodiment of the smartphone 106 shown in FIG. 1.

In one embodiment, the smartphone 106 may have a typical configuration and characteristics in its hardware aspects and also in many of its software aspects, except that the smartphone 106 may be programmed suitably to allow it to perform a role or roles in the self-checkout system 100 of FIG. 1. A description of the functionality provided by the smartphone 106 in connection with its role or roles in the self-checkout system 100 will be set forth below in subsequent portions of this disclosure, including—for example— the discussion below of FIGS. 6 and 7. Apart from the functionality described in the discussion of other drawings, a brief overview of some salient aspects of the smartphone 106 will be provided immediately below in connection with FIG. 3.

The smartphone 106 may include a housing 302. In many embodiments, the front of the housing is predominantly constituted by a touchscreen (not separately shown), which is a key element of the user interface 304 of the smartphone 106.

The smartphone 106 further includes a conventional mobile processor/control circuit 306, which is contained within the housing 302. Also included in the smartphone 106 is a storage/memory device or devices (reference numeral 308). The storage/memory devices 308 are in communication with the processor/control circuit 306 and may contain program instructions to control the processor/control circuit to manage and perform various functions of the smartphone 106. As is well-known, such functions include operation as a mobile voice communication device via interaction with a mobile telephone network (not shown). Further conventional functions include operation as a mobile data communication device, and also as what is in effect a pocket-sized personal computer, via programming with a number of application programs, or "apps." (The apps are represented at block 310 in FIG. 3, and may in practice be stored in block 308, to program the processor/control circuit 306 in myriad ways.) The above-referenced mobile communications functions are represented by block 312, and in addition to programmed control functions, the mobile communications functions also rely on hardware features (not separately shown) such as an antenna, a transceiver circuit, a microphone, a loudspeaker, etc.

Block 314 in FIG. 3 represents payment-related functionality of the smartphone 106. This functionality may, for example, resemble or overlap with apps of the kind that have been proposed to enable mobile device to emulate IC (integrated circuit) payment cards. The payment functionality 314 may, for example, include a wallet app (also sometimes referred to as a payment app or payment application).

Still further, the smartphone 106 may include a short-range communication capability (block 316) or one or more such capabilities. These may include, for example, Bluetooth communications and/or communications according to the well-known WiFi standard.

In addition, as is commonly the case with such devices, the smartphone 106 may include a camera 318, which may provide digital images for storage in and/or processing by the smartphone 106 and may otherwise act as a product scanner.

From the foregoing discussion, it will be appreciated that the blocks depicted in FIG. 3 as components of the smartphone 106 may in effect overlap with each other, and/or there may be functional connections among the blocks which are not explicitly shown in the drawing.

It has been posited that the device carried by the user 104 and indicated by reference numeral 106 in FIGS. 1 and 3 may be embodied as a smartphone, but this assumption is not intended to be limiting, as the user's device may alternatively, in at least some cases, be constituted by a tablet computer that has mobile communication capabilities or by other types of mobile computing devices.

Figure 4:
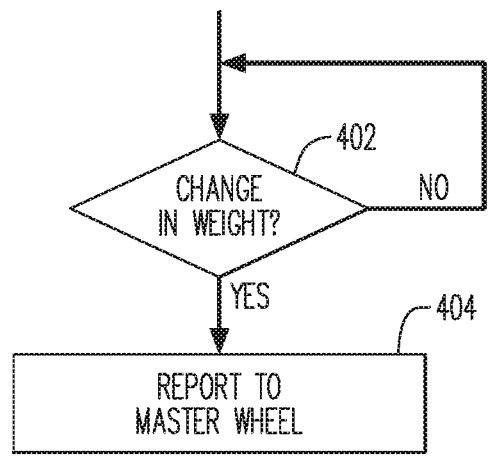
FIGS. 4-7 are flow charts that illustrate processes that may be performed in the system of FIG. 1.

FIG. 4 is a flow chart that illustrates a process that may be performed in an above-mentioned embodiment in which the wheel assemblies 114 (FIGS. 1 and 2) include both a master wheel assembly and subordinate wheel assemblies. In particular, FIG. 4 illustrates a process that may be performed by a typical one of the subordinate wheel assemblies.

At decision block 402 in FIG. 4, the subordinate wheel assembly determines (e.g., via operation of its force-detection module 212 (FIG. 2)) whether there is an apparent change in the weight of the shopping cart 108 and/or its contents. If so, then block 404 may follow decision block 402. At block 404, the subordinate wheel assembly in question may send—to the master wheel assembly—a signal that indicates the apparent change in weight. That signal may be processed, conditioned and/or transmitted by the processing and communications unit 214 of the subordinate wheel assembly in question.

It should be understood that the process illustrated in FIG. 4 may be performed at various points in time by all of the subordinate wheel assemblies. It may typically be the case that an event related to the weight or apparent weight of the shopping cart 108 may be detected substantially simultaneously by all of the subordinate wheel assemblies (and by the master wheel assembly as well).

Figure 5:
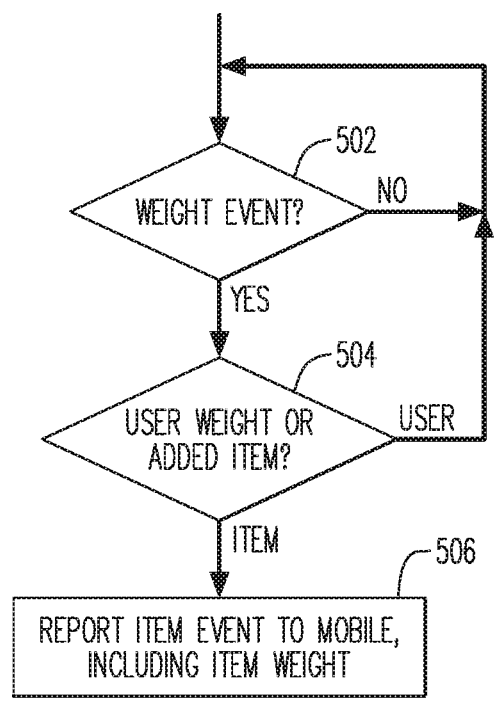

FIG. 5 is a flow chart that illustrates another process that may be performed in the above-mentioned embodiment that includes both a master wheel assembly and subordinate wheel assemblies. Particularly with respect to FIG. 5, the process illustrated therein may be performed in the master wheel assembly.

At decision block 502 in FIG. 5, the master wheel assembly determines whether a weight event has occurred. A weight event may be, for example, (a) a detected change in weight in the shopping cart 108 or its contents according to the force-detection module 212 (FIG. 2) of the master wheel assembly, and/or (b) a message received by the processing and communications unit 214 of the master wheel assembly from another one of the wheel assemblies in which the other wheel assembly reports that it has detected a change in weight in the shopping cart 108 or its contents.

In the process of FIG. 5, decision block 504 may follow decision block 502 if a weight event was detected at decision block 502. At decision block 504, the master wheel assembly may determine whether the weight event detected at decision block 502 (considered alone and/or in combination with other weight events that have occurred close in time with each other and with the initial weight event) is indicative of either (i) an item having been added to the contents of the shopping cart 108, on one hand, or (ii) the user applying downward force, or an increase in downward force on the shopping cart 108, on the other hand.

In some embodiments, the master wheel assembly, and particularly its processing and communications unit 214, may have been loaded with a series of event profiles to aid the processing and communications unit 214 in determining whether a weight event or collection of weight events is indicative of an item having been added to the shopping cart or is rather a mere artifact of interaction between the user and the cart structure (e.g., the user leaning on the cart). The series of profiles may have been developed during the design phase of the system 100. This may occur, for example, by training a neural network associated with a prototype retrofitted cart with a series of events including both adding items to the prototype cart and user handling/leaning on the prototype cart, such that the events of interest (addition of items to the cart) can be distinguished from events not of interest (impingement of weight from the user on the cart) based on receiving and analyzing the weight signals provided by the "smart" wheel assemblies on the prototype shopping cart. With the resulting event profiles, or by other suitable means, the processing and communications unit 214 of the master wheel assembly has previously been programmed to detect events of interest (adding of items to the cart), to disregard events not of interest, and to calculate the weight of the added items, on an item-by-item (event-by-event) basis.

If at decision block 504, the master wheel assembly has determined that an item has been added to the shopping cart 108, then block 506 may follow decision block 504. At block 506, the processing and communications unit 214 of the master wheel assembly may use weight information from its own force-detection module 212 and from the force-detection modules of the other wheel assemblies to calculate the weight of the item determined (at decision block 504) to have been added to the shopping cart 108. In addition, in block 506, the processing and communications unit 214 of the master wheel assembly may report to the smartphone 106 (FIG. 1) that an item has been added to the shopping cart 108 and how much the item weighs. The depositing of an item in the shopping cart 108 may be referred to as an "item event."

Figure 6:
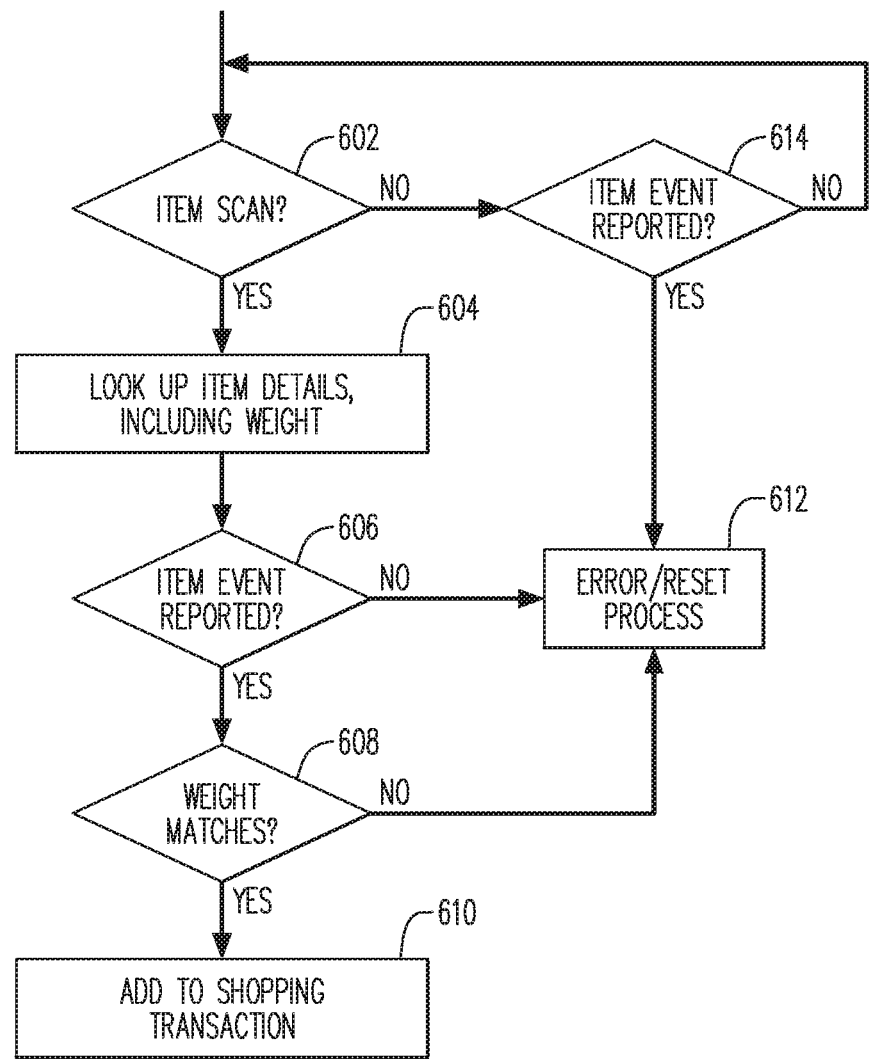

FIG. 6 is a flow chart that illustrates a process that may be performed by the smartphone 106 in some embodiments in connection with the smartphone performing a role in the system 100. For example, the process of FIG. 6 may represent operation of a dedicated mobile app that has been downloaded to the smartphone 106 to enable the smartphone 106 to perform functions as described herein. The app in question may be referred to as a "self-checkout app." The self-checkout app may interact with a generally conventional wallet app and/or payment app that has also been downloaded to the smartphone 106.

For purposes of the process illustration shown in FIG. 6, it may be assumed that the user 104 is engaged in a shopping visit to a retail store, as schematically illustrated in FIG. 1. It may be further assumed that the user 104 has the smartphone 106 in his/her possession (as also illustrated in FIG. 1) and that the user 104 has interacted with the smartphone 106 to open and launch the self-checkout app.

Referring now to FIG. 6, at decision block 602, the self-checkout app may determine whether the user 104 has presented an item for scanning. That is, the self-checkout app may determine whether an item (presumably selected from a store shelf for purchase by the user 104) has been presented for barcode/symbol reading by the smartphone 106 via its camera 318. In some embodiments, the smartphone's scanning of the item to be purchased may entail reading of either or both of a UPC (Universal Product Code) barcode and/or a QR (Quick Response) code that is present on the item to be purchased.

If a positive determination is made at decision block 602 (i.e., if a successful product scan has occurred), then block 604 may follow decision block 602. At block 604, the self-checkout app may communicate with the store computer 118 to use the information obtained via the item scan to look up details for the selected item. It will be appreciated that the item details may include a verbal identification of the item (e.g., "[store brand] corn flakes", the price of the item, and the weight of the item. (It is assumed that the customary product database maintained in the store computer to support product identification via scanning may have been supplemented with weight information for each product item in the database.) As part of the process step of block 604, the self-checkout app may set a flag to indicate that a successful product scan and/or identification has occurred, and that an item event (addition of an item to the contents of the shopping cart 108) is anticipated.

In the process of FIG. 6, decision block 606 may follow block 604. At decision block 606, the self-checkout app may determine whether it has received a report of an item event (i.e., a report—per block 506 in FIG. 5—that an item has been added to the shopping cart 108). It will be appreciated that such a report may be provided by the master wheel assembly and will occur if the user 104 deposits in the shopping cart 108 the item that was scanned at 602 and identified at 604.

If a positive determination is made at decision block 606 (i.e., if an item report is received), then decision block 608 may follow decision block 606. At decision block 608, the self-checkout app may determine whether the item weight as reported in the item report received at 606 matches the item weight as looked up and received from the store computer 118 at 604. If so, then block 610 may follow decision block 608. At block 610, the self-checkout app may add the item to be purchased to a shopping transaction that was initiated when the user opened and launched the self-checkout app. Adding the item to the shopping transaction may include increasing the transaction total by the price for the item, as looked up at 604. That is, the self-checkout app may maintain a running total of the price amounts for the items selected by the user 104, scanned using the smartphone 106, and deposited in the shopping cart 108.

In a process branch not explicitly shown in FIG. 6, the process of FIG. 6 may loop back from block 610 to decision block 602.

Considering again decision block 608, if a negative determination is made at that decision block (i.e., if the item weight reported by the master wheel assembly does not match the item weight as looked up at 604), then an error process block 612 may follow decision block 608. For example, in this instance, as part of the error process block 612, the smartphone 106 may prompt the user to take remedial action in view of the item weight mismatch. The remedial action may include one or more of the following: (A) removing the item in question from the shopping cart; (B) seeking assistance from a store employee; and/or (C) aborting the self-checkout process and directing the user (at the completion of the shopping visit) to utilize a conventional attended checkout lane for this shopping visit.

Considering again decision block 606, in some instances a negative determination may be made at that decision block. For example, after an item scan occurs, and a flag is accordingly set to expect an item event, a predetermined period of time may time out, which may lead to a negative determination at decision block 606—i.e., a determination that no item event has been reported. In the case of such a negative determination, again an error process (again represented by block 612) may follow decision block 606. This error process may include one or more suitable prompts to the user 104 from the smartphone 106. For example, the user 104 may be presented with an opportunity to "cancel last scanned item." In addition or alternatively, the user 104 may be prompted to "deposit last scanned item in shopping cart."

Considering again decision block 602, if a negative determination is made at that decision block (i.e., if no item scan has occurred), then decision block 614 may follow decision block 602. At decision block 614, the self-checkout app may determine whether an item event has been reported. If a negative determination is made at decision block 614 (i.e., if the smartphone 106 has not received a report that an item has been deposited in the shopping cart 108), then the process of FIG. 6 may loop back to decision block 602 from decision block 614. It will be observed that the process of FIG. 6 may thus inhabit an idle loop made up of decision blocks 602 and 614 unless and until either the user scans an item with the smartphone 106 or the user deposits an item in shopping cart 108.

Considering again decision block 614, if a positive determination is made at that decision block (i.e., an item report is received at a time when the flag to expect an item report has not been set), then it again may be the case that an error process may follow. Once more the error process is represented by block 612. In this instance, the error process may include a prompt from the smartphone 106 to the user 104 to remind the user 104 that the item to be purchased must be scanned. In some embodiments, the user may additionally or alternatively be given an option to abort self-checkout and to utilize an attended checkout aisle at the end of the shopping visit.

In all of the error processes described above, there may be other or additional prompts to the user 104 or other actions taken to remedy the detected error. In at least some cases, the error process may include the wheel assemblies detecting that an item has been removed from the cart and reporting that event to the smartphone 106. The error process may then include detecting an item scan, identification of the item, and detecting deposit of the item back in the cart, in similar fashion as was described above in connection with blocks 602, 604, 606, 608 and 610.

Figure 7:
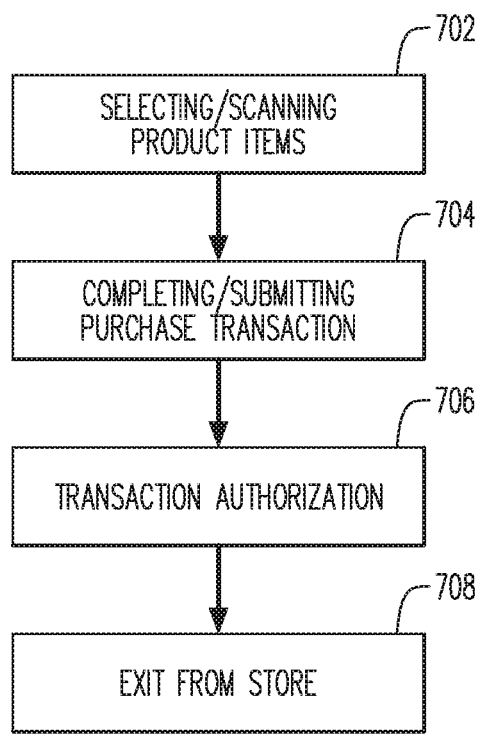

FIG. 7 is a high-level flow chart that illustrates a process that may be performed in the system 100 of FIG. 1. The process illustrated in FIG. 7 may include some or all of the processing previously described in connection with FIGS. 4-6.

At block 702 in FIG. 7, the user 104 engages in selecting items to purchase. As each item is selected, it is scanned by the smartphone 106 and deposited in the shopping cart 108. Communication from the wheel assemblies 114 to the smartphone 106 occurs as described above to report item events and item weights. Communication between the smartphone 106 and the store computer 118 occurs as described above to obtain look-up of the selected product items, and downloading of item information (including the standard item weight) from the store computer 118 to the smartphone 106.

At block 704 in FIG. 7, a purchase transaction is completed and submitted with respect to the purchased items at the conclusion of the user's shopping visit to the retail store. As noted above (in connection with block 610, FIG. 6), during the shopping visit, and while the user 104 is gathering items to be purchased, the self-checkout app may maintain a running total of prices of the items selected for purchase. In some embodiments, the user 104 may interact with the smartphone 106 to indicate to the self-checkout app that the selection of items is complete and the user 104 is ready to checkout. (For example, the user 104 may allow her/his fingerprint to be scanned by the payment app/self-checkout app—e.g., via the touchscreen of the smartphone 106—to simultaneously indicate that checkout is to be completed and to authenticate himself/herself to the payment functionality in the smartphone 106.) In other embodiments, when the user approaches an exit gate (not shown) in the store, with the shopping cart 108 and the smartphone 106, the smartphone 106 may receive a signal from the exit gate to indicate that the time for checkout is at hand, and the self-checkout app may respond to the signal by entering a completion phase of the purchase transaction. In some embodiments, a final total for the transaction, including applicable taxes, may be calculated by the self-checkout app. To facilitate this, in some embodiments, information relating to the taxability of items, and the applicable tax rate, may be downloaded from the store computer 118 to the self-checkout app. This may occur at the time the purchase transaction is being completed and/or item-by-item as the items are being gathered by the user 104. In other embodiments, the purchase transaction total, including applicable taxes, may be calculated by the store computer 118 in response to information provided to it by the self-checkout app. In any case, the purchase transaction, including the grand total purchase transaction amount, is provided to, or at least partially generated or augmented by, the store computer 118.

In some embodiments, an error process may be initiated if any further item is deposited in the shopping cart 108 after the completion phase of the purchase transaction has been signaled to the smartphone 106.

At 706 in FIG. 7, the store computer 118 may use the purchase transaction total amount, plus payment account information provided by the smartphone 106 (e.g., from a wallet app or payment app operating in cooperation with the self-checkout app) to generate a substantially conventional payment account transaction authorization request message for routing via the payment system 122 to the payment account issuer (not separately shown). The payment system 122 may be, for example, the payment system operated by MasterCard International Incorporated, which is the assignee hereof. Assuming that all is in order with the user's payment account and with the transaction authorization request message, a favorable transaction authorization response message may be routed back to the store computer 118 from the payment system 122. At that point, for example, the exit gate may be operated (e.g., in response to the store computer 118) to permit the user 104 to exit (block 708, FIG. 7) from the store with the shopping cart 108 and the selected items for purchase carried within the shopping cart 108.

In some embodiments, as noted above, the user may initiate completion and authorization of the purchase transaction at any location in the store by suitable interaction with the smartphone 106. In such case, assuming authorization has been successful, this may be communicated to the smartphone 106. Then, when the user approaches the exit gate with the smartphone 106 and the shopping cart 108, the smartphone may signal to the exit gate to indicate that the purchase transaction has been previously authorized. In response to the signal from the smartphone, the exit gate may open to allow the user to leave the store with cart and contents.

Among other advantages, the system 100 as described herein may improve convenience in shopping and self-checkout, while possibly also deterring or discouraging theft. For example, the system 100 may improve convenience by reminding the user to scan an item when the user has forgotten to do so before depositing the item in the shopping cart. In some embodiments, by checking the weight of the item via the cart against the standard weight as looked up via the smartphone, the system 100 may help prevent unscrupulous shoppers from scanning an inexpensive item and then depositing a different, more expensive item in the shopping cart.

In some embodiments, exit gates that interact with a smartphone 106 (as part of the system 100 as described herein) may be located at a number of different locations around the perimeter of the store to increase the convenience of egress from the store in connection with self-checkout.

In some embodiments, the weighing of items may be accomplished by a suitable, scale-equipped, intelligent hand-held shopping basket rather than a wheeled shopping cart.

In some embodiments, the shopping cart as originally manufactured may include the "smart" wheel assemblies as described herein, instead of such wheel assemblies being retrofitted portions of the cart, as described in an earlier portion of this disclosure.

In some embodiments, at the exit gate, a weighing scale (not shown) may be installed in the floor of the store building to weigh the shopping cart 108 and its contents to confirm that the total weight of the items in the cart reflects the list of items scanned using the smartphone 106. In some embodiments, the smartphone 106 may communicate with the weighing scale in the floor to indicate the correct total weight of the scanned items. In some embodiments, a tare weight for the cart may also be communicated to the floor scale, either from the smartphone 106 or from the master wheel assembly of the shopping cart 108. In the latter case, the shopping cart tare weight has been previously communicated to the smartphone 106 from the master wheel assembly. In some embodiments, the tare weight for the cart may be determined by weighing the cart on a (different) floor scale at the beginning of the user's shopping visit and before any items have been deposited in the cart.

In some embodiments, either via one or more wheel assemblies or via the smartphone 106, the path of the user and the cart through the store may be tracked, e.g., for the purpose of providing location-specific promotional messages to the user and/or for determining typical traffic/shopper travel patterns through the store.

In some embodiments, it may not be the case that one wheel assembly acts as "master," and—in such embodiments—each wheel assembly 114 may communicate weight signals directly to the smartphone 106. In such embodiments, the smartphone 106 may itself process the weight signals from the wheel assemblies to detect item events and to determine the weight of each item deposited in the shopping cart 108.

In some embodiments, the shopping cart may be configured somewhat differently from the shopping cart as described above. For example, the shopping cart may lack the above-described "smart" wheel assemblies, and instead may have an item weighing element installed in association with a basket portion of the shopping cart. The weighing element may be battery powered (but not necessarily recharged by rotation of the cart wheels); the weighing element may have communications capabilities to transmit item events and item weights to the smartphone 106. In some embodiments, each cart may have a tether for attaching it to other shopping carts during storage of the same, and the tether may include a conductive connection for providing recharging current to the battery in the basket-based weighing element.

In some embodiments, there may be variations in the process described above in connection with FIG. 6. For example, the self-checkout app may offer a "delay scan" option to the user (e.g., as a virtual button on the touchscreen on the smartphone). In operation of this feature, the sequence of events may be as follows: (1) The user actuates the delay scan option. (2) The user deposits an item to be purchased in the shopping cart with the barcode/QR code on the item exposed and available for scanning. (3) The self-checkout app notes the item event and sets a flag (with time-out period) to expect an item scan. (4) The user employs the smartphone to scan the item just placed in the shopping cart. (5) The self-checkout app looks up the scanned item, and compares its standard weight with the weight reported as part of the item event.

In some embodiments, the user may be permitted to switch the self-checkout app between a scan-first mode of operation and a "delay scan" mode of operation.

In some embodiments, the self-checkout app may additionally or alternatively offer to the user an option to remove an item from the purchase transaction. For example, the user may select this option, then remove the item from the shopping cart and scan it. The self-checkout app may look-up the item just scanned and then verify that it matches in weight the item apparently just removed from the shopping cart.

In cases where weight from the user applied to the shopping cart distorts the detected weight of an item added to the cart, according to some embodiments the smartphone may instruct the user to (a) release the cart; (b) re-scan the item; and (c) re-deposit the item in the cart. The smartphone may emit an audible alarm/alert signal under these circumstances to indicate to the user that something had gone wrong with the original scanning/weighing operation. In some embodiments, the smartphone—when appropriate—may advise the user not to lean on the cart while depositing items therein.

In some embodiments, items are scanned as deposited in the cart and the cumulative weight (based on identification of the items) is kept track of by the smartphone. (Produce items may be weighed on a mainly conventional weighing/pricing scale installed in the produce section of the store—if the store is a grocery—and the weight of the produce items may be communicated from the scale to the smartphone). It is assumed for this embodiment that the shopping cart has no weighing capability. At the completion of the shopping visit, the shopping cart with contents may be weighed at an exit weighing station. The weight of contents (i.e., the purchased items only) may then be calculated (e.g., by the smartphone; e.g., by subtracting a tare weight for the cart that was determined when the cart was empty at the start of the shopping visit). The total weight of the purchased items may then be compared (e.g., by the smartphone) to the cumulative weight that had been determined based on scanning, etc., by the smartphone. Such an embodiment may prove to be a useful way to encourage/enforce compliance with self-checkout procedures.

In some embodiments, aspects of the shopping cart and/or the self-checkout system may facilitate bagging of purchased items, either as the items are selected or at the end of the shopping visit. For example, the shopping cart may support a small rack (not shown) for holding shopping bags. The weight of the shopping bags may be included in the tare weight for the shopping cart determined at the beginning of the shopping visit. As the shopping visit progresses, the user may remove shopping bags from the rack and place selected items in them, with the bags already held in the shopping cart. In some embodiments, a suitable routine in the smartphone app may detect and discount events in which the bags are removed from the rack and then placed in the cart.

In some embodiments, the shopping cart may include a suitable holder or shelf (neither shown)—e.g., a rubberized shelf—on which the user may place his/her smartphone while pushing the cart with both hands. When the user stops pushing the cart to select and scan an item, he/she may remove the smartphone from the shelf, scan the item, and return the smartphone to the shelf. Intelligence in the master wheel assembly, with analysis of signals from force-detection modules of all wheel assemblies, may detect and disregard the resulting additions/removals of weight to/from the cart due to placing the smartphone on or removing it from the shelf.

In some embodiments, at least a portion of the functionality provided by the user's mobile device may instead be provided by a suitable module (e.g. a POS module, not shown), incorporated in the shopping cart. For example, the POS module, if present, may: (a) scan items to be purchased one-by-one, as selected by the user; (b) receive item event signals from the/a wheel assembly or assemblies; (c) confirm that all items deposited in the cart have been scanned and match the item's standard weight; (d) remind the user to scan items placed in the shopping cart without having been scanned; (e) calculate a transaction total reflecting all items that were scanned; (f) receive payment credentials (e.g., by NFC or other short range communications or by reading a magnetic stripe) from a user's payment card/payment-enabled smartphone or the like; (g) initiate a purchase transaction authorization request message; and (h) receive a purchase transaction authorization response message.

Figure 8A:
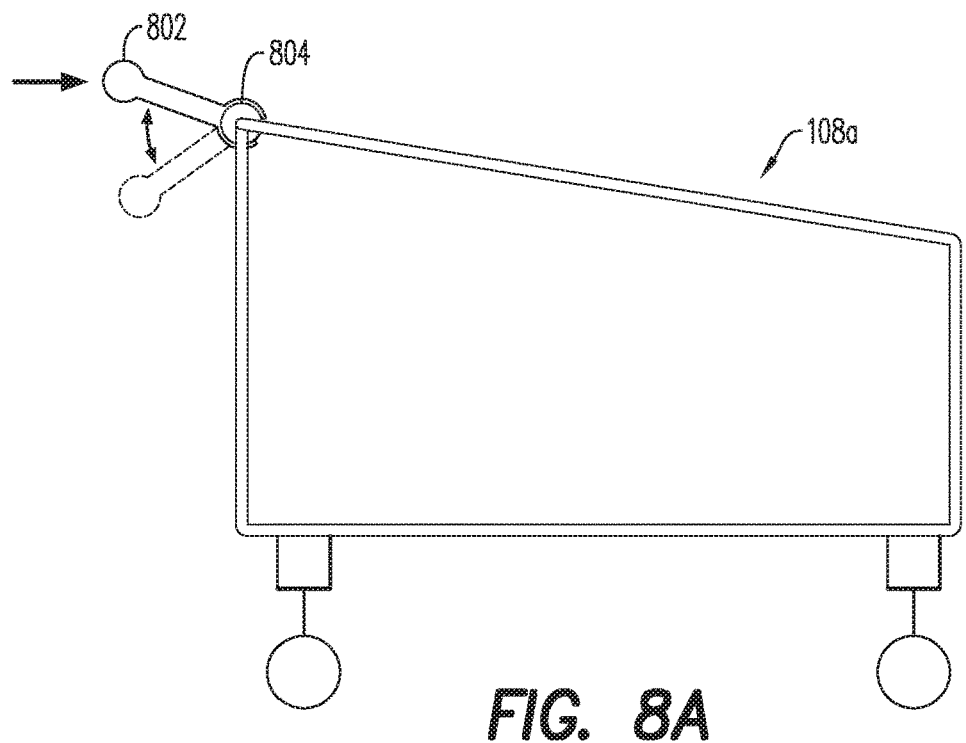
FIGS. 8A-8C schematically illustrate aspects of an alternative embodiment of a shopping cart shown in FIG. 1.
Figure 8B:
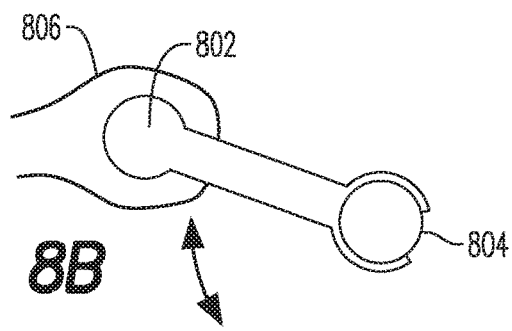
Figure 8C:
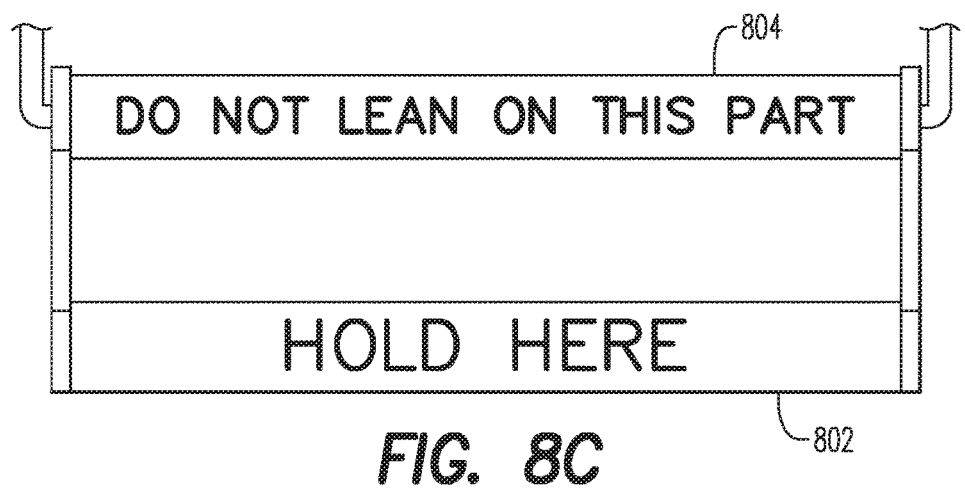

FIGS. 8A-8C illustrate aspects of an alternative embodiment of the shopping cart. This embodiment of the shopping cart is generally indicated by reference numeral 108a. To mitigate or eliminate effects from the user leaning on the cart, the cart 108a may have a handle 802 that is pivotally mounted on the cart. The handle may be such that it is intended to be contacted by the user for the purpose of pushing the cart 108a. FIG. 8B is a close-up view of the handle 802, pivotally mounted on a mounting bar 804 that is fixed at the top-rear of the cart body. FIG. 8B also shows the handle 802 grasped by the user's hand, schematically represented at 806.

FIG. 8C shows notices that may be provided on the shopping cart 108a to guide the user away from leaning on the cart. As seen from FIG. 8C, the mounting bar 804 may bear the notice, "Do not lean on this part," whereas the handle 802 may bear the notice, "Hold here."

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable.

As used herein and in the appended claims, the term "payment account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment account number" includes a number that identifies a payment system account or a number carried by a payment card, or a number that is used to route a transaction in a payment system that handles debit card and/or credit card transactions. The term "payment card" includes a credit card, debit card, prepaid card, or other type of payment instrument, whether an actual physical card, virtual, electronic wallet or the like.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A wheel assembly for installation on a shopping cart to retro-fit the shopping cart for facilitating self-checkout by replacing a wheel on the shopping cart with the wheel assembly, said wheel being a first wheel, the wheel assembly comprising:
   a support structure;
   a second wheel rotatably supported on the support structure;
   a mounting mechanism secured or integral to the support structure to allow the wheel assembly to be retrofittingly mounted to a body of the shopping cart;
   a rechargeable battery supported by the support structure;
   a charging module supported on the support structure, the charging module configured to convert rotational energy of the wheel into electrical energy for charging the rechargeable battery;
   a force-detection module supported on the support structure and configured to provide a signal related to an item event in which an item is deposited within the shopping cart; and
   a processing and communications unit configured to receive the signal from the force-detection module and to transmit said signal to a device that is separate from the wheel assembly.

2. The wheel assembly of claim 1, wherein the device that is separate from the wheel assembly is another wheel assembly.

3. The wheel assembly of claim 1, wherein the device that is separate from the wheel assembly is a mobile device.

4. The wheel assembly of claim 3, wherein the mobile device is a payment-enabled smartphone.

5. The wheel assembly of claim 1, wherein the processing and communications unit is configured to engage in wireless communication with a device that is separate from the wheel assembly.

6. The wheel assembly of claim 1, wherein the force-detection module includes a strain-gauge.

7. A method comprising:
   receiving, in a shopping cart wheel assembly, a signal indicative of an event in which an item is deposited within a shopping cart; and
   reporting the event to a mobile device from a processing and communications unit of the wheel assembly; said reporting including reporting a weight of the item;
   the method further comprising:
   prior to the reporting step, calculating the weight of the item based at least in part on signals received from a plurality of other wheel assemblies.

* * * * *